United States Patent
Klöpzig et al.

(10) Patent No.: US 8,967,304 B2
(45) Date of Patent: Mar. 3, 2015

(54) DRIVEN VEHICLE AXLE

(75) Inventors: Markus Klöpzig, Ebermannstadt (DE);
Heinz-Werner Neumüller, Uttenreuth (DE)

(73) Assignee: Simens Aktiengesellschaft, Munich (DE)

( * ) Notice: Subject to any disclaimer, the term of this patent is extended or adjusted under 35 U.S.C. 154(b) by 150 days.

(21) Appl. No.: 13/146,346

(22) PCT Filed: Nov. 26, 2009

(86) PCT No.: PCT/EP2009/065902
§ 371 (c)(1),
(2), (4) Date: Jul. 26, 2011

(87) PCT Pub. No.: WO2010/086046
PCT Pub. Date: Aug. 5, 2010

(65) Prior Publication Data
US 2011/0290571 A1    Dec. 1, 2011

(30) Foreign Application Priority Data

Jan. 27, 2009    (DE) .......................... 10 2009 006 196

(51) Int. Cl.
| | |
|---|---|
| *B60K 6/20* | (2007.10) |
| *B60W 20/00* | (2006.01) |
| *B60K 7/00* | (2006.01) |
| *B60L 7/28* | (2006.01) |
| *B60K 17/04* | (2006.01) |

(Continued)

(52) U.S. Cl.
CPC .................. *B60L 7/28* (2013.01); *B60K 7/0007* (2013.01); *Y02T 10/70* (2013.01); *Y02T 10/6217* (2013.01); *Y02T 10/7077* (2013.01); *B60K 17/043* (2013.01); *B60K 2007/0092* (2013.01); *B60K 1/02* (2013.01); *B60L 11/14* (2013.01); *B60K 6/52* (2013.01); *Y02T 10/6265* (2013.01); *B60L 11/123* (2013.01); *B60K 6/46* (2013.01); *B60L 2220/44* (2013.01)
USPC ..................................... 180/65.21; 180/65.28

(58) Field of Classification Search
USPC ........ 180/65.235, 65.25, 65.1, 65.28, 65.265, 180/65.245, 6.44, 6.7, 65.21
See application file for complete search history.

(56) References Cited

U.S. PATENT DOCUMENTS 3,994,354 A * 11/1976 Haumaier ................ 180/65.245
4,998,591 A * 3/1991 Zaunberger ................. 180/6.44

(Continued)

FOREIGN PATENT DOCUMENTS

| DE | 3530746 | 3/1987 |
|---|---|---|
| DE | 4142863 | 4/1993 |

(Continued)

OTHER PUBLICATIONS

International Search Report issued May 7, 2010 in corresponding application PCT/EP2009/065902.

(Continued)

*Primary Examiner* — Hau Phan
(74) *Attorney, Agent, or Firm* — Staas & Halsey LLP

(57) ABSTRACT

The embodiments relate to a driven vehicle axle, which is coupled or can be coupled to an internal combustion engine and/or at least one electric machine that optionally can be operated as an engine or generator and which includes a brake device having an eddy current brake (10).

15 Claims, 1 Drawing Sheet

(51) Int. Cl.
*B60L 11/14* (2006.01)
*B60K 6/52* (2007.10)
*B60L 11/12* (2006.01)
*B60K 6/46* (2007.10)
*B60K 1/02* (2006.01)

(56) References Cited

U.S. PATENT DOCUMENTS

| | | | |
|---|---|---|---|
| 5,031,900 | A | 7/1991 | Leask |
| 5,372,213 | A * | 12/1994 | Hasebe et al. ............... 180/65.6 |
| 5,419,406 | A * | 5/1995 | Kawamoto et al. .......... 180/65.6 |
| 5,947,855 | A * | 9/1999 | Weiss .......................... 180/65.25 |
| 6,557,673 | B1 | 5/2003 | Desta et al. |
| 6,719,655 | B2 * | 4/2004 | Kramer ..................... 180/65.235 |
| 6,830,529 | B2 * | 12/2004 | Phelan et al. ................. 475/221 |
| 6,918,469 | B1 * | 7/2005 | Pribonic et al. ............... 188/165 |
| 7,112,155 | B2 * | 9/2006 | Keuth .............................. 475/6 |
| 7,654,083 | B2 * | 2/2010 | Iida et al. ......................... 60/456 |
| 8,075,436 | B2 * | 12/2011 | Bachmann ........................ 475/5 |
| 8,292,769 | B2 * | 10/2012 | Lawson, Jr. ...................... 475/5 |
| 2003/0116361 | A1 | 6/2003 | Smith et al. |
| 2003/0166429 | A1 | 9/2003 | Tumback |
| 2004/0035656 | A1 | 2/2004 | Anwar et al. |
| 2006/0226700 | A1 | 10/2006 | Liu |
| 2010/0025131 | A1 * | 2/2010 | Gloceri et al. ........... 180/65.265 |

FOREIGN PATENT DOCUMENTS

| | | |
|---|---|---|
| DE | 10257617 | 7/2003 |
| FR | 2006962 | 1/1970 |
| FR | 2842961 | 1/2004 |
| GB | 1524452 | 9/1978 |
| JP | 2001-22107 | 4/2001 |
| JP | 2001-309638 | 11/2001 |
| JP | 2002-142306 | 5/2002 |
| JP | 2002-223555 | 8/2002 |
| JP | 2003-531764 | 10/2003 |
| JP | 2005-238936 | 9/2005 |
| JP | 2005-287235 | 10/2005 |
| JP | 2007-22378 | 2/2007 |
| JP | 2007-153125 | 6/2007 |
| JP | 2008-178259 | 7/2008 |
| KR | 20-0198397 | 7/2000 |
| WO | 02/43229 | 5/2002 |

OTHER PUBLICATIONS

German Office Action issued Sep. 10, 2009 in corresponding application DE 10 2009 006 196.7-32.
European Search Report dated Jul. 3, 2012 issued in corresponding European Patent Application No. 09771527.0.
Japanese Office Action mailed Feb. 12, 2013 for corresponding Japanese Application No. 2011-546641.
Japanese Office Action mailed Nov. 19, 2013 in corresponding Japanese Patent Application No. 2011-546641.
German Office Action dated Aug. 4, 2014 in corresponding German Patent Application No. 102009006196.7.

* cited by examiner

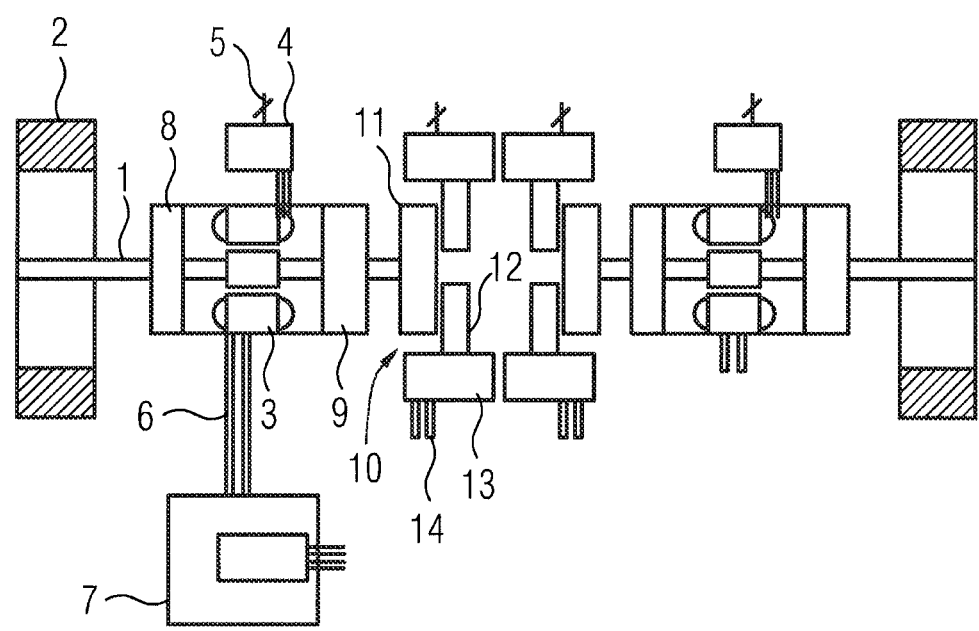

DRIVEN VEHICLE AXLE

CROSS REFERENCE TO RELATED APPLICATIONS

This application is the U.S. national stage of International Application No. PCT/EP2009/065902, filed Nov. 26, 2009 and claims the benefit thereof. The International Application claims the benefits of German Application No. 10 2009 006 196.7 filed on Jan. 27, 2009, both applications are incorporated by reference herein in their entirety.

BACKGROUND

The embodiments relate to a driven vehicle axle, which is or may be coupled to an internal combustion engine and/or at least one electric machine operable either as a motor or a generator and which comprises a brake device.

Such driven vehicle axles are used in vehicles with a hybrid drive or in wholly electric vehicles. Hybrid vehicles are motor vehicles which are driven by at least one electric motor and at least one further different motor. At present, hybrid vehicles predominantly comprise an internal combustion engine and an electric machine.

Hybrid electric vehicles, also known as hybrid vehicles, may be variously configured. In general, a distinction may be drawn between hybrid vehicles with serial hybrid drive, those with parallel hybrid drive and power split vehicles. In serial hybrid drives the internal combustion engine drives an electric generator, in order to generate current for charging an electric power storage system or in order directly to drive an electric motor. In a parallel hybrid drive the hybrid vehicle is driven both by an internal combustion engine and by an electric motor, so meaning that the internal combustion engine and electric motor may be of smaller construction. Power split hybrid drives combine the features of a serial hybrid drive and a parallel hybrid drive. During a journey the internal combustion engine and the generator may either merely charge the electric power storage system and drive the electric motor or alternatively drive a vehicle axle, depending on the driving situation. A clutch enables switching between the different operating states.

In conventional hybrid drive motor vehicles, conventional brake devices are used, typically hydraulic brake systems, which are comparatively complex and require a large amount of installation space and regular servicing. Although the electric machine may also produce a degree of braking action when operating as a generator, this braking action is insufficient at higher speeds, such that a conventional brake device has additionally to be provided, which may take the form for example of a hydraulic disk brake.

SUMMARY

An object of the embodiments is to provide a driven vehicle axle whose brake device is of simpler and thus cheaper construction.

To achieve this object, in the case of a driven vehicle axle of the above-mentioned type provision is made according to the embodiments for the brake device to comprise an eddy-current brake.

In an eddy-current brake the eddy-current losses of a component rotating in the magnetic field are used for braking. Thus, the driven vehicle axle according to the embodiments may be braked by the eddy-current brake, whereby the kinetic energy is converted into heat. In this way the driven vehicle axle may be braked even at relatively high speeds on the one hand by the braking action of the electric machine operating as a generator and additionally by the eddy-current brake, without there being any need for an additional separate brake device, for example a hydraulic disk brake. Such an eddy-current brake is less expensive than a hydraulic brake device and requires only little installation space.

Provision may be made for the driven vehicle axle according to the embodiments to include two electric machines and two eddy-current brakes, one electric machine and one eddy-current brake being provided in each case to drive one wheel. This configuration makes it possible to do without a differential.

It is alternatively feasible, however, for the vehicle axle according to the embodiments to be provided for driving two wheels and to comprise a differential gear.

According to one further development of the vehicle axle according to the embodiments, provision may be made for a gear train to be arranged between the or each electric machine and a wheel driven by the vehicle axle. The advantage of this is that the rotational speed of the electric machine is increased and the torque reduced, so meaning that the structural size of the electric machine may be reduced. The gear train may be configured such that the electric machine may be operated in an optimum operating range.

It is also possible, in the case of a vehicle axle according to the embodiments, for a gear train to be arranged between the electric machine and the eddy-current brake. This gear train enables the braking action of the eddy-current brake to be optimized and increased, since the braking action is dependent on the frequency of the magnetic field and is determined by the rotational speed and the pole pair number.

With the driven vehicle axle according to the embodiments, the at least one eddy-current brake may preferably be engaged or disengaged by a clutch. The clutch makes it possible to change between different operating states of a hybrid electric vehicle, which is particularly important in the case of power split hybrid vehicles.

An even better braking action is achieved for the driven vehicle axle according to the embodiments if the braking action of the eddy-current brake is controllable by a control device. In this way the eddy-current brake may be actuated in such a way that virtually constant deceleration may be achieved over a given wheel speed range, which is perceived as pleasant by the occupants of the vehicle. The braking action is controlled in such a way that the static friction of the wheels, which limits maximum braking action, is not exceeded.

To control the eddy-current brake, provision may be made in the case of the vehicle axle according to the embodiments for the eddy-current brake to include a stationary portion and a portion which is mobile relative thereto, the braking action being adjustable by displacement of the mobile portion. Thus, the braking action of the eddy-current brake may be continuously controlled as a function of the operating state.

In a further configuration of the embodiments the brake device of the vehicle axle may comprise a parking brake. A parking brake is necessary, since the eddy-current brake has no effect when a vehicle is stationary.

In addition, the embodiments relate to a hybrid or electric vehicle. The hybrid or electric vehicle according to the embodiments include at least one vehicle axle of the type described.

According to one further development of the hybrid or electric vehicle, provision may be made for it to include a heating unit, which is designed to absorb the heat emitted by the at least one electric machine and/or the at least one eddy-current brake. The heat of friction arising during the braking process may be used to air condition the interior of the hybrid or electric vehicle, such that the generation of heat by electric current for air conditioning purposes may be dispensed with.

In this connection it is particularly preferable for the heating unit of the hybrid or electric vehicle according to the invention to comprise a heat accumulator. This heat accumulator may absorb and accumulate the heat arising during braking operations, in order to release it again if required to air condition the interior.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a schematic representation and shows the essential components of a vehicle axle according to the invention, which may be used in a hybrid vehicle.

DETAILED DESCRIPTION OF THE PREFERRED EMBODIMENT

The vehicle axle 1 is of symmetrical construction and comprises a vehicle wheel 2 at each of its ends, which may be driven by an electric machine 3. To actuate and control the electric machine 3, a control device (controller) 4 is provided, which is connected on the one hand to the electric machine 3 and on the other hand to an electrical connection 5. The electric machine 3 comprises cooling connections 6, which are connected to a schematically illustrated heat accumulator 7 via a heat exchanger, such that the electric machine 3 may be cooled and the heat accumulator 7 heated. The heat accumulator 7 may be used to air condition the interior of the hybrid vehicle.

Between the vehicle wheel 2 and the electric machine 3 there is arranged a gear train 8, by which the rotational speed of the electric machine 3 is increased and the torque reduced. The gear train 8 is configured such that the electric machine 3 is operated in an optimum speed range.

At the opposite end of the electric machine 3 there is arranged a gear train 9, which connects the electric machine 3 to an eddy-current brake 10. The eddy-current brake 10 includes a rotatable, mobile portion 11 and a stationary portion 12, which may be moved by an actuator 13. In the exemplary embodiment shown, the actuator 13 takes the form of an electric geared motor, which brings about linear displacement of the stationary portion 12. In the exemplary embodiment illustrated, the stationary portion 12 may be moved axially relative to the axle 1. However, other configurations are also possible, in which the actuator 13 may displace the stationary portion 12 radially, in order to control the braking action of the eddy-current brake 10. A plurality of stationary portions 12 may also be provided, which are coupled together mechanically for displacement or which may each be moved by a separate actuator. The actuator 13 is connected to a control device, not shown in the FIGURE, via an electrical connection 14.

As is shown in the FIGURE, the opposing vehicle wheel is likewise coupled to an electric machine and an eddy-current brake, the vehicle axle being of symmetrical construction.

When the driver of the hybrid vehicle triggers a braking operation, on the one hand the electric machine 3 has a braking action, while at the same time the distance between the rotatable portion 11 and the stationary portion 12 of the eddy-current brake 10 may be reduced by the actuator 13, such that the eddy-current brake 10 acts as an additional brake. Thus, an integrated electromagnetic brake device is provided, by which a conventional hydraulic disk brake may be replaced. The structural sizes of the electric machine 3 and the eddy-current brake 10 may be optimized by the configuration of the gears 8, 9. During travel, the braking action of the eddy-current brake 10 may be precisely matched to the respective operating state by control of the brake. In the case of regenerative (recuperative) braking, the eddy-current brake 10 may be deactivated, such that the electric machine 3 is operated as a generator and the kinetic energy is converted into electric power, which may be stored in a battery. If a stronger braking action is required, however, for example in the event of emergency braking initiated by the driver, the eddy-current brake 10 is additionally activated by an actuating operation of the actuator 13, such that the eddy-current brake 10 also acts and ensures maximum braking action.

The waste heat generated during the braking operation of the eddy-current brake 10 and also by the electric machine 3 may be collected in the heat accumulator 7 and used to air condition the hybrid vehicle, such that no electric power has to be used for this purpose.

The invention claimed is:

1. A driven vehicle axle system, which is coupleable to one of an internal combustion engine and at least one electric machine operable either as a motor or a generator and which comprises a propulsion axle coupled to the one of an internal combustion engine and at least one electric machine and a brake device directly coupled to the propulsion axle, wherein the brake device comprises an eddy-current brake,
wherein the eddy-current brake comprises a stationary portion and a portion which is mobile relative thereto, the braking action being adjustable by displacement of the mobile portion toward and away from the propulsion axle,
wherein motion of the mobile portion toward the axle increases braking and motion of the mobile portion away from the axle decreases braking.

2. The vehicle axle as claimed in claim 1, further comprising two electric machines and two eddy-current brakes, one electric machine and one eddy-current brake being coupled to the propulsion axle and to drive one wheel.

3. The vehicle axle as claimed in claim 2, wherein a gear train is arranged between the or each electric machine and a wheel driven by the vehicle axle.

4. The vehicle axle as claimed in claim 2, wherein a gear train is arranged between the electric machine and the eddy-current brake.

5. The vehicle axle as claimed in claim 1, wherein the vehicle axle is provided for driving two wheels and further comprises a differential gear.

6. The vehicle axle as claimed in claim 1, wherein the at least one eddy-current brake may be engaged or disengaged by a clutch.

7. The vehicle axle as claimed in claim 1, wherein the braking action of the eddy-current brake may be controlled by a control device.

8. The vehicle axle as claimed in claim 1, wherein the brake device further comprises a parking brake.

9. A hybrid or electric vehicle, comprising at least one vehicle axle as claimed in claim 1.

10. The hybrid or electric vehicle as claimed in claim 9, further comprising a heating unit, which is designed to absorb the heat emitted by the at least one vehicle and/or the at least one eddy-current brake.

11. The hybrid or electric vehicle as claimed in claim 10, wherein the heating unit comprises a heat accumulator.

12. A driven vehicle axle system, which is coupleable to one of an internal combustion engine and at least one electric machine operable either as a motor or a generator and which comprises a propulsion axle coupled to the one of an internal combustion engine and at least one electric machine and a brake device directly coupled to the propulsion axle, wherein the brake device comprises an eddy-current brake,
  wherein the eddy-current brake comprises a stationary portion and a portion which is mobile relative thereto, the braking action being adjustable by displacement of the mobile portion toward and away from the propulsion axle,
  wherein motion of the mobile portion toward the axle increases braking and motion of the mobile portion away from the axle decreases braking.

13. An axle system, comprising:
  a motor;
  a propulsion axle coupled to the motor; and
  an eddy current brake directly coupled to the propulsion axle,
  wherein the eddy-current brake comprises a stationary portion and a portion which is mobile relative thereto, the braking action being adjustable by displacement of the mobile portion toward and away from the propulsion axle;
  wherein motion of the mobile portion toward the axle increases braking and motion of the mobile portion away from the axle decreases braking.

14. A driven vehicle axle system, which is coupleable to one of an internal combustion engine or at least one electric machine operable either as a motor or a generator and which comprises a propulsion axle coupled to the one of an internal combustion engine and at least one electric machine and a brake device directly coupled to the propulsion axle, wherein the brake device comprises an eddy-current brake,
  wherein the eddy-current brake comprises a stationary portion and a portion which is mobile relative thereto, the braking action being adjustable by displacement of the mobile portion toward and away from the propulsion axle,
  wherein motion of the mobile portion toward the axle increases braking and motion of the mobile portion away from the axle decreases braking.

15. A driven vehicle axle system, which is coupleable to an internal combustion engine or an electric machine operable either as a motor or a generator and which comprises a propulsion axle coupled to the one of an internal combustion engine and at least one electric machine and a brake device directly coupled to the propulsion axle, wherein the brake device comprises an eddy-current brake,
  wherein the eddy-current brake comprises a stationary portion and a portion which is mobile relative thereto, the braking action being adjustable by displacement of the mobile portion toward and away from the propulsion axle,
  wherein motion of the mobile portion toward the axle increases braking and motion of the mobile portion away from the axle decreases braking.

* * * * *